United States Patent
Ogata et al.

(10) Patent No.: US 7,269,589 B2
(45) Date of Patent: Sep. 11, 2007

(54) DATABASE MANAGING METHOD AND SYSTEM HAVING DATA BACKUP FUNCTION AND ASSOCIATED PROGRAMS

(75) Inventors: Sadayuki Ogata, Yokohama (JP); Junichi Nakao, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 377 days.

(21) Appl. No.: 10/414,494

(22) Filed: Apr. 16, 2003

(65) Prior Publication Data

US 2004/0015520 A1    Jan. 22, 2004

(30) Foreign Application Priority Data

Apr. 26, 2002    (JP) .............................. 2002-125175

(51) Int. Cl.
G06F 17/30    (2006.01)

(52) U.S. Cl. ............................... 707/9; 707/1; 707/204
(58) Field of Classification Search .................... 707/8, 707/9, 200
See application file for complete search history.

(56) References Cited

U.S. PATENT DOCUMENTS

| 5,625,815 | A | | 4/1997 | Maier et al. |
| 5,701,458 | A | * | 12/1997 | Bsaibes et al. ................ 707/9 |
| 5,761,500 | A | | 6/1998 | Gallant et al. |
| 6,317,281 | B1 | | 11/2001 | Ogawa et al. |
| 6,564,215 | B1 | * | 5/2003 | Hsiao et al. .................... 707/8 |
| 6,591,278 | B1 | * | 7/2003 | Ernst ....................... 707/104.1 |
| 6,748,393 | B1 | | 6/2004 | Kapoor et al. |
| 2002/0133490 | A1 | * | 9/2002 | Conkwright et al. .......... 707/9 |
| 2003/0177149 | A1 | * | 9/2003 | Coombs ..................... 707/204 |
| 2003/0217064 | A1 | | 11/2003 | Walters |

* cited by examiner

Primary Examiner—Jeffrey Gaffin
Assistant Examiner—Tomasz Ponikiewski
(74) Attorney, Agent, or Firm—Antonelli, Terry, Stout & Kraus, LLP.

(57) ABSTRACT

A backup method is provided for backing up a data base of an additional storage type that added data is not updated and deleted. An attribute of data update refusal, i.e., an attribute of only data reference permission is set to each storage area in which a table is stored. It is judged for each storage area that a file once backed up is not necessary to be backed up again. Data stored in the storage area and backed up as the collective backup or divisional backup is not backed up again. The backup time can therefore be shortened.

15 Claims, 6 Drawing Sheets

| FILE | PARTITION | KEY VALUE RANGE | UPDATE PERMISSION/ REFUSAL | BACKUP NECESSARY/ UNNECESSARY | SETTING DATE AND TIME |
|---|---|---|---|---|---|
| A | 1 | 1995.4~1995.9 | PERMITTED | NECESSARY | 2000.2.12 9:00 |
| B | 1 | 1995.10~1996.3 | REFUSED | UNNECESSARY | 2001.4.20 9:00 |
| C | 1 | 1995.4~1996.3 | REFUSED | UNNECESSARY | 2001.4.20 9:00 |
| D | 2 | 1996.4~1996.9 | REFUSED | NECESSARY | 2001.10.30 18:11 |
| E | 2 | 1996.4~1996.9 | REFUSED | NECESSARY | 2001.10.15 19:27 |
| F | 3 | 1996.10~1997.3 | PERMITTED | NECESSARY | 2001.3.15 19:27 |

FIG.4

| KEY VALUE RANGE | UPDATE PERMISSION/ REFUSAL | ITEM NAME | UPDATE PERMISSION/ REFUSAL | ITEM NAME | UPDATE PERMISSION/ REFUSAL |
|---|---|---|---|---|---|
| 1995.4~1995.9 | ◎ | a, b, c | ◎ | d | ● |
| 1995.10~1996.3 | | | ● | | |
| 1996.4~1996.9 | ● | a, b, c | ◎ | d | ● |
| 1996.10~1997.3 | | | | d | ◎ |
| 1997.4~1997.9 | ◎ | a, b, c | ● | d | ◎ |
| 1997.10~1997.12 | | | | d | ◎ |

ATTRIBUTE CHANGE: TABLE A

EXECUTE    CANCEL

DATABASE MANAGING METHOD AND SYSTEM HAVING DATA BACKUP FUNCTION AND ASSOCIATED PROGRAMS

BACKGROUND OF THE INVENTION

The present invention relates to database management techniques of managing data stored in a database.

As a method of backing up data stored in a database (DB), a method for a relational database is known which backs up data in the unit of table of DB. Another method is also known which backs up data in each divisional storage area if a table is divided and data is stored in each divisional storage area by designating a data storage destination.

SUMMARY OF THE INVENTION

In a database management system, a data backup time is required to be incorporated into a running schedule. The data backup time taken to acquire a backup is dependent upon the data amount. In a database of the type that data is sequentially added, the data amount increases with time so that the backup time becomes longer. In backing up data in the whole table, there arises the problem that the backup time becomes longer than that in the running schedule. Even in backing up data in each divisional storage area of a table, as the data amount increases, it becomes necessary to divide the table again. These backup methods are also associated with the problem that the backup process time becomes longer since even the data not updated is backed up a plurality of times.

An object of the invention is to provide a database management method and system capable of reducing the number of backup times.

According to the invention, an attribute of data update refusal (only data reference permission) is set to each storage area storing a table, and it is judged for each storage area that a backup of a file once backed up is not necessary. Data stored in the storage area and backed up as the collective backup or divisional backup is not backed up again. The backup time can therefore be shortened. Upon occurrence of a DB failure, data having the attribute of update refusal can be recovered by reflecting the backup data. It is therefore unnecessary that the database operation is time sequentially reflected. The recovery time can therefore be shortened.

Other objects, features and advantages of the invention will become apparent from the following description of the embodiments of the invention taken in conjunction with the accompanying drawings.

DESCRIPTION OF THE EMBODIMENTS

Embodiments of the invention will be described with reference to the accompanying drawings.

Figure 1:
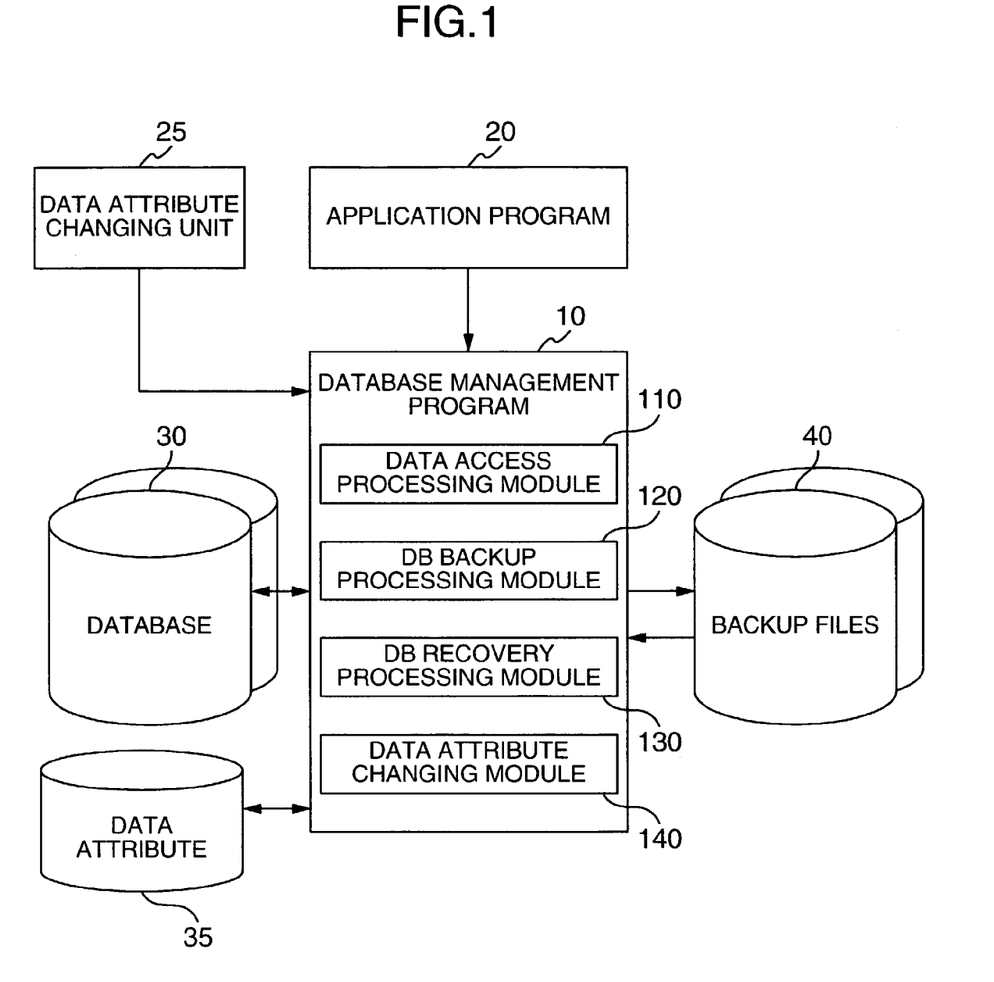
FIG. 1 is a block diagram showing the overall structure of a system according to an embodiment of the invention.

FIG. 1 shows an example of the structure of a database system which additionally stores data, according to an embodiment of the invention. A database management program 10 has: a data access processing module 110 for managing a database 30 and its backup files 40 and processing a data access request from an application program 20; a DB backup processing module 120 for backing up data stored in the database 30; a DB recovery processing module 130 for recovering data from the backup file 40 and storing it in the database 30; and a data attribute changing module 140 for registering a data attribute in a data attribute table 35 or changing a data attribute stored in the data attribute table 35. A user inputs a data attribute to a data attribute changing unit 25 which in turn sends it to the data attribute changing module 140.

Figure 2:
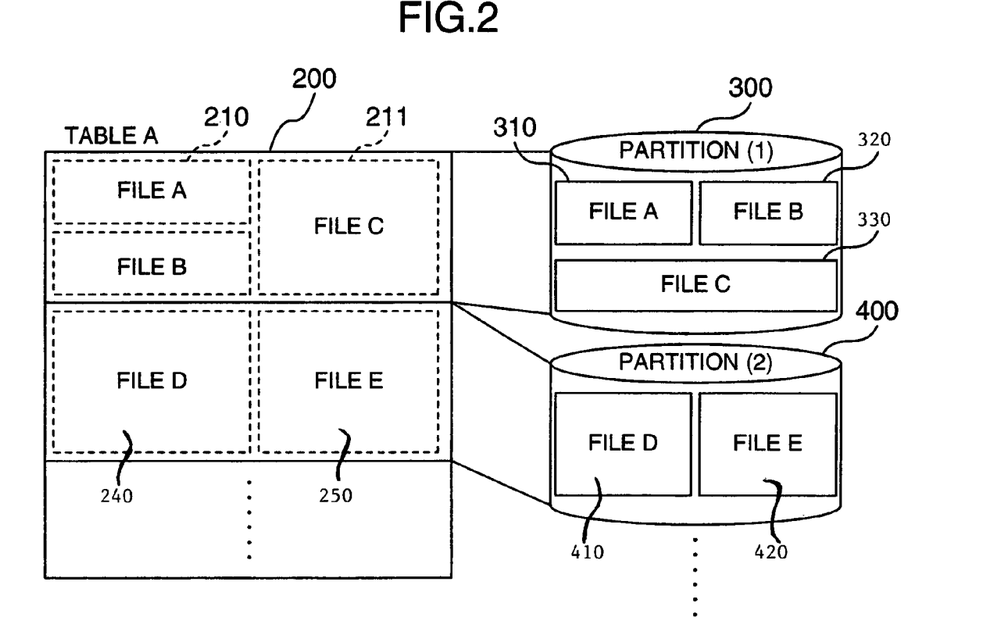
FIG. 2 is a schematic diagram showing the structure of a database in which data is divisionally stored.

FIG. 2 shows the relation between a table constituting a database and a physical storage area for storing the table. A table A 200 is constituted of partitions (1) 300, (2) 400, . . . , which are physical storage areas for storing partial data divided in accordance with a key value. Logical files A 210, B 220 and C 230 divided along configuration columns of the table A 200 are mapped to files A 310, B 320 and C 330 of the partition (1) 300, respectively. Similarly, for other partial data, files D 240 and E 250 divided along the configuration columns of the table A 200 are mapped to files D 410 and E 420 of the partition (2) 400, respectively.

Figure 3:
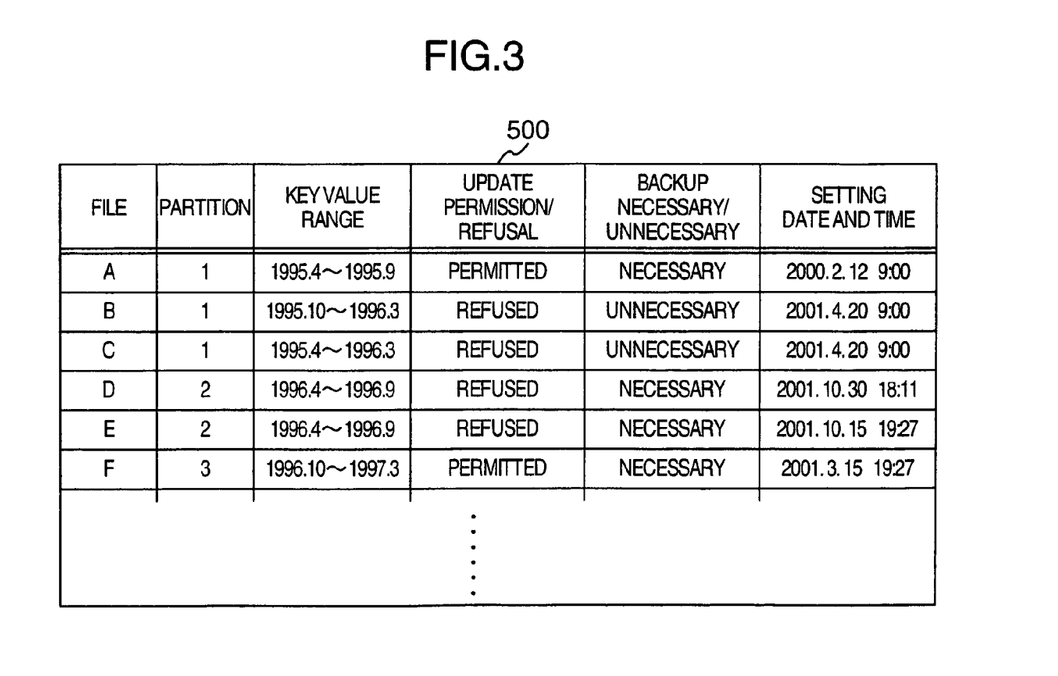
FIG. 3 shows the data contents in a management table for managing a DB table.

Division information of the table A 200 is stored in a corresponding management table 500 shown in FIG. 3. This table 500 stores information about the relation between a key value range and a file, the key value being used for dividing files and partitions constituting the table A 200. The table 500 also stores information of an attribute of update permission of data in each key value range or an attribute of only reference permission of the data (also called an attribute of update refusal). The table also stores information on whether a backup of data is necessary or unnecessary when the attribute of the data transits to the attribute of only reference permission. This information shows an attribute of whether the data is to be backed up for the first time after the attribute of the data transits to the attribute of only reference permission, or an attribute indicating that the data has already been backed up. The table also stores information of setting date and time which indicate the date and time when the attribute of the data changes from the attribute of update permission to the attribute of only reference permission or vice versa.

Figure 4:
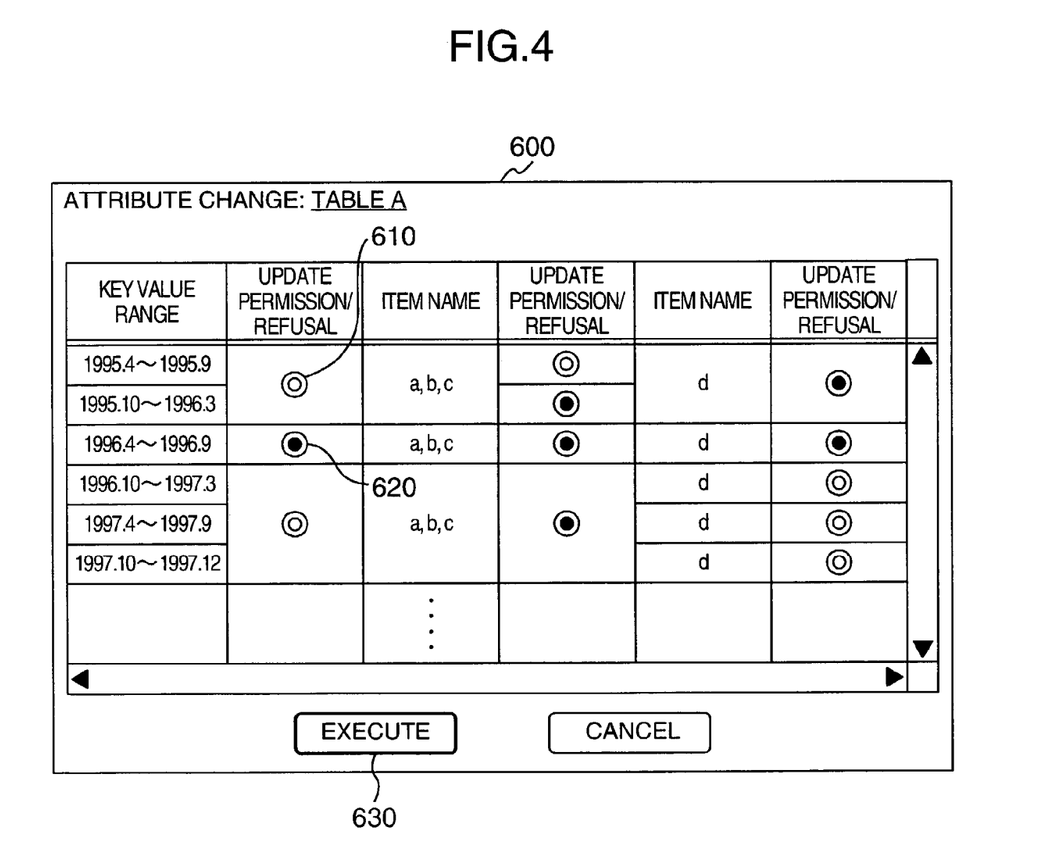
FIG. 4 is an operation display screen from which a data attribute is changed.

FIG. 4 shows an example of a display screen to be used for changing the data attribute. By using an attribute changing display screen 600, the attribute of data stored in the table A 200 can be changed for each physical storage area called a file, in accordance with the key value range and an item name or names. The physical storage area has hierarchical levels including volumes, disks, partitions, files, pages and the like. In this embodiment, of these levels, although the file is used by way of example, any level may be used. This embodiment aims to reduce the number of backup times of the same data. In order to achieve this object of the embodiment, a logical storage area may also be used. For example, each group of data having the update refusal attribute is backed up and thereafter the group is set with the attribute that the backup of the group is unnecessary. Therefore, although the physical storage area and file are used in this embodiment, the logical storage area and group may also be used.

For each key value range, if the attribute of update permission is changed to the attribute of only reference permission, a button is changed to that indicated at 620. If the attribute of only reference permission is changed to the attribute of update permission, the button is changed to that indicated at 610. This attribute changing operation can be performed for each item name or names representative of columns constituting data in the database. An attribute change instruction is sent from the attribute changing display screen 600 to the database management program 10 (data attribute changing module 140) by clicking an execution button 630. In response to the attribute change instruction, the attribute of each file in the management table 500 is changed. For example, if update permission/refusal information in the management table 500 is "PERMITTED" for the file instructed to be changed to the attribute of update refusal, then the update permission/refusal information is set to "REFUSED", current date and time are written in the setting date and time field, and information "NECESSARY" is written in a backup necessary/unnecessary field. If the update permission/refusal information in the management table 500 is "REFUSED" for the file instructed to be changed to the attribute of update permission, then the update permission/refusal information is set to "PERMITTED", current date and time are written in the setting date and time field, and information "UNNECESSARY" is written in the backup necessary/unnecessary field. If the update permission/refusal information in the management table 500 is "PERMITTED" for the file instructed to be changed to the attribute of update permission or if the update permission/refusal information in the management table 500 is "REFUSED" for the file instructed to be changed to the attribute of update refusal, information of the file in the management table 500 is not changed. In this example shown in FIG. 4, data having the key value range of 1995.4 to 1995.9 and the key value range of 1995.10 to 1196.3 and the item names a, b and c is stored in one file. A correspondence between the unit of the storage area to be backed up and the area in the table is presented to a user. It is therefore advantageous in that the user is not allowed to set the update permission/refusal for a plurality of storage areas at a time, and that it is easy to confirm whether the storage area corresponds to which table.

Figure 5:
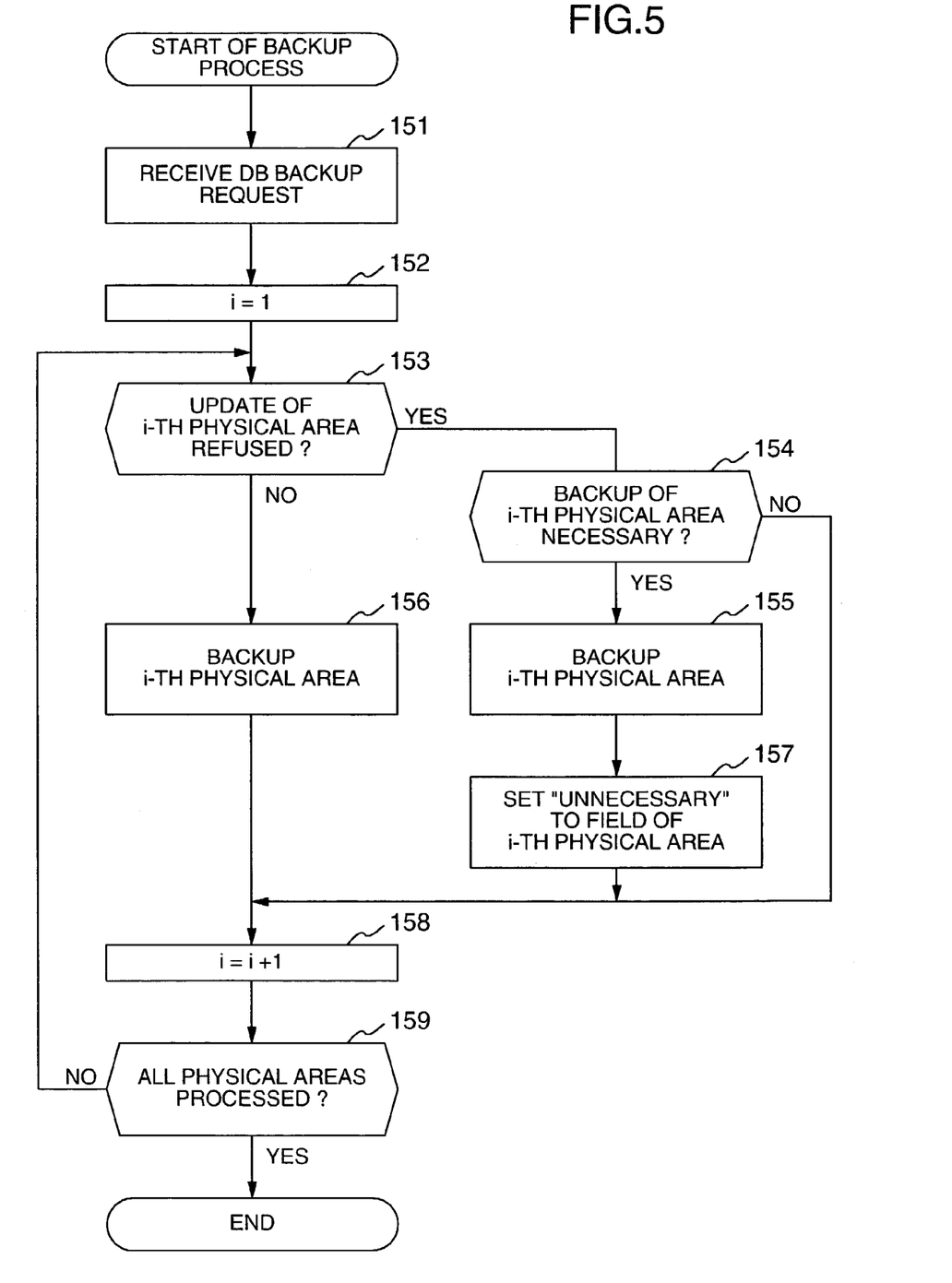
FIG. 5 is a flow chart illustrating an operation of acquiring a backup in accordance with the data attribute.

Next, by referring to FIG. 5, a backup process to be executed by the system of this embodiment will be described. FIG. 5 is a flow chart illustrating a backup process to be executed upon arrival of a backup timing or upon reception of a backup request. At Step 151 a DB backup request is received from the application program 20. At Step 152 a counter i is set to "1" to refer to the file to be backed up, from the top of the management table 500. At Step 153 it is checked whether the i-th file is not permitted to be updated. If the file is not permitted to be updated, then at Step 154 it is checked whether the backup is the first time after the file attribution is changed to the attribute of backup necessary, i.e., the attribute of only reference permission. If the backup is necessary, at Step 155 the file is output to a backup file and at Step 157 "UNNECESSARY" is written in the backup necessary/unnecessary field corresponding to the file. If it is judged at Step 154 that the backup is unnecessary (because the backup has been already made), the flow branches to the next Step 158. If it is judged at Step 153 that the update is permitted, then at Step 156 the file is output to the backup file. At Step 158 the counter i is incremented by "1" to make the next file to be backed up. If it is judged at Step 159 that the backup of the final file is completed, then the backup process is terminated. With this process, if it is judged that the file is not permitted to be updated, this file can be backed up only once. If a file is to be backed up again, "PERMITTED" is written in the update permission/refusal field corresponding to the file and "NECESSARY" is written in the backup necessary/unnecessary field, so that the backup can be made again.

Figure 6:
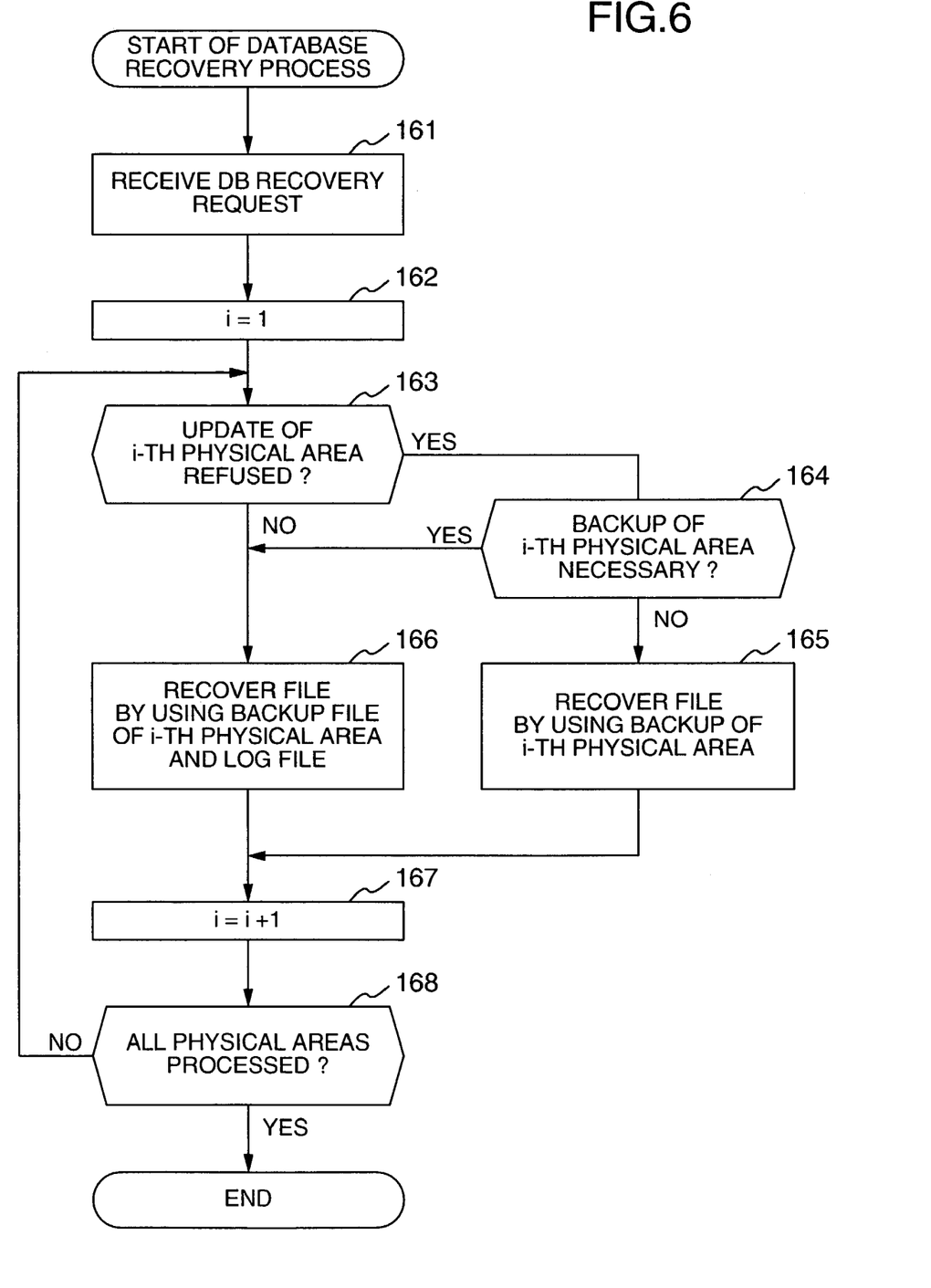
FIG. 6 is a flow chart illustrating an operation of recovering data from a backup in accordance with the data attribute.

Next, a database recovery process to be executed by the system of the invention will be described. FIG. 6 is a flow chart illustrating the database recovery process to be executed upon arrival of a database recovery timing. At Step 161 a DB recovery request is received from an external. At Step 162 a counter i is set to "1" to refer to the file to be recovered, from the top of the management table 500. At Step 163 it is checked whether the i-th file is not permitted to be updated. If the file is not permitted to be updated, then at Step 164 it is checked whether it is necessary to back up the i-th file. In this case, if the file is still not backed up after the attribute is changed to the attribute of backup necessary, i.e., the attribute of only reference permission, then at Step 166 a backup of the file is acquired and by using the backup file and a log file which records the database operation time sequentially, the file is recovered. If it is judged at Step 164 that the backup is not necessary, i.e., that the file is not updated after the backup thereof, at Step 165 the file is recovered by using only the backup file. At Step 167 the counter i is incremented by "1" to make the next file to be recovered. If it is judged at Step 168 that the recovery of the final file is completed, then the recovery process is terminated.

Figure 7:
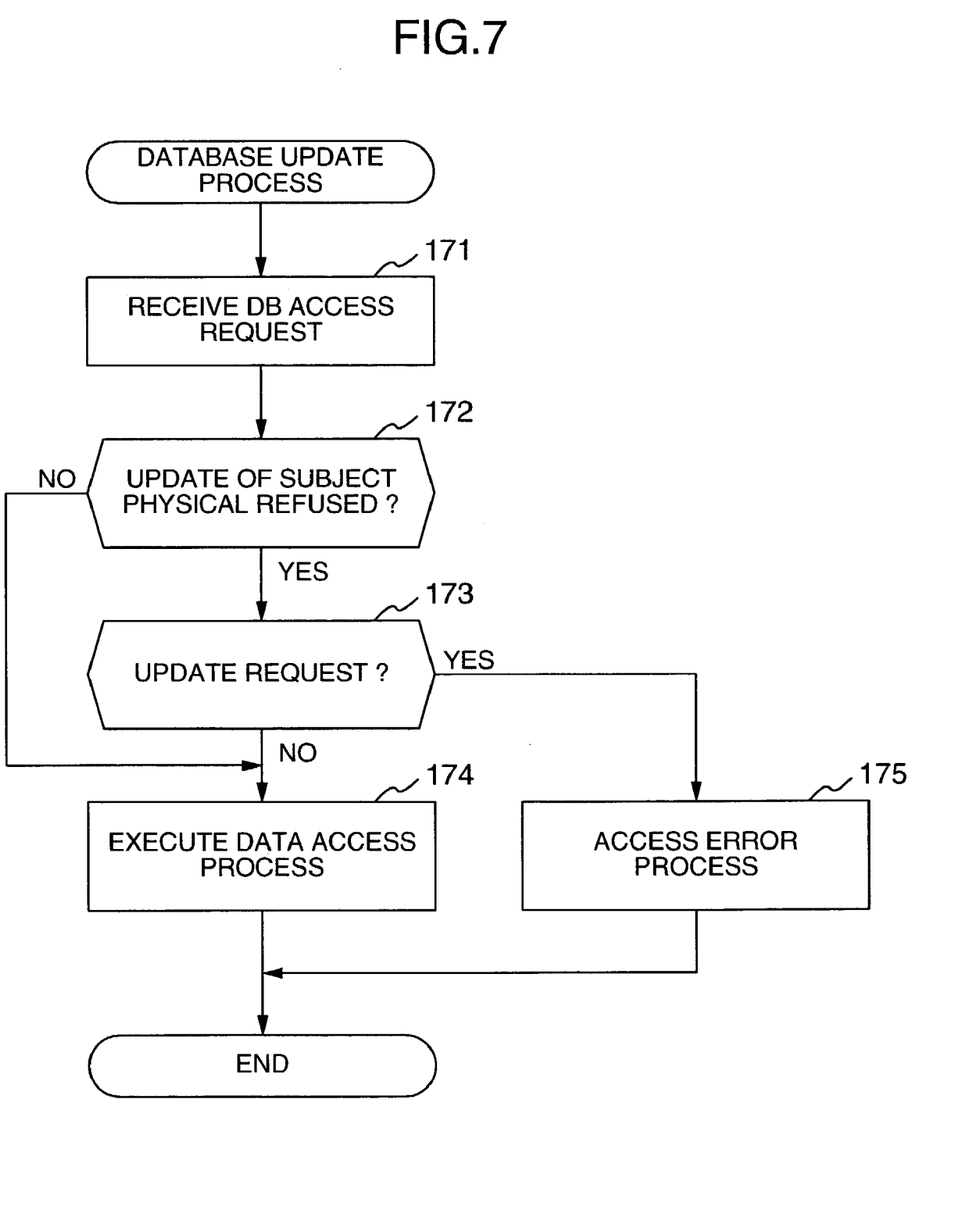
FIG. 7 is a flow chart illustrating an operation of processing an access request from an application program in accordance with the data attribute.

Next, by referring to FIG. 7, a database access process to be executed by the system of the embodiment will be described. FIG. 7 is a flow chart illustrating the database access process to be executed upon arrival of a database access timing. At Step 171 a database access request is received from the application program. At Step 172 it is judged, by referring to the management table 500 corresponding to the table of data to be accessed, whether the subject row of the table is refused to be updated. If the update is refused, it is judged at Step 173 whether the DB access request is an update request. If not or if update of the data is not refused, the data access process is executed at step 174. If it is judged at Step 173 that the DB access request is the update request, an error process is executed at step 175. Namely, if the DB access request is an update request for the data having the attribute of only reference permission, this request is judged as an error and an error code is returned to the application program.

A method of backing up data added or updated may be incorporated. In this case, however, since the embodiment assumes that collective backup data is acquired, it becomes necessary to manage a series of difference backup data along with the collective backup data.

According to the embodiment described above, it is possible to shorten the time taken to back up data by narrowing the range of data to be backed up.

The number of backup times of data not updated can be reduced.

Not only the backup time can be shortened, but also the database recovery is possible without analyzing the log file so that the recovery time can be shortened.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A database management method for a database system which stores data divisionally in a plurality of storage areas, the method comprising:
    setting an access attribute of update to either permission or refusal for a plurality of files, and when changing the access attribute from update permission to update refusal, changing a backup attribute to designate backup;
    executing an update of data in response to a data update request from an application program when update requested data is for a file having an access attribute of update permission;
    judging the data update request as an error when the update requested data is for the file having an access attribute of update refusal;
    implementing a backup operation for each respective file of the plurality of files, according to:
        making a backup of a file when it has the access attribute of update permission;
        making a backup of the file when it has the access attribute of update refusal when the backup is the first backup procedure after the access attribute of the file changes from the access attribute of update permission to the access attribute of update refusal, irrespective of whether or not a content of the file has changed since a last backup of the file; and,
        not making a backup of the file when the backup is not the first backup procedure after the access attribute changes from the access attribute of update permission to the access attribute of update refusal.

2. The method according to claim 1, wherein the access attribute is changed to the attribute of update refusal by a flag which manages a transition of the attribute.

3. The method according to claim 1, wherein a function is provided to randomly set the attribute of update permission and the attribute of update refusal.

4. A database management system for a database system which stores data divisionally in a plurality of storage areas, comprising:
    means for setting an access attribute of update to either permission or refusal for a plurality of files, and when changing the access attribute from update permission to update refusal, changing a backup attribute to designate backup;
    means for storing data records divisionally in logical files and storing information of an access control of each file, including an attribute of update permission of data in the file and an attribute of update refusal;
    an updating unit to execute an update of data in response to a data update request from an application program when update requested data is for a file having an access attribute of update permission;
    a judging unit to judge the data update request as an error when the update requested data is for the file having an access attribute of update refusal; and
    a backup unit to implement a backup operation for each respective file of the plurality of files, according to:
        make a backup of a file when it has the access attribute of update permission;
        make a backup of the file when it has the access attribute of update refusal when the backup is the first backup procedure after the access attribute of the file changes from the access attribute of update permission to the access attribute of update refusal, irrespective of whether or not a content of the file has changed since a last backup of the file; and,
        not make a backup of the file when the backup is not the first backup procedure after the access attribute changes from the access attribute of update permission to the access attribute of update refusal.

5. The system according to claim 4, wherein the access attribute is changed to the attribute of update refusal by a flag which manages a transition of the attribute.

6. The system according to claim 4, wherein a function is provided to randomly set the attribute of update permission and the attribute of update refusal.

7. At least one machine-readable storage medium having a database management program stored thereon, for a database system which stores data divisionally in a plurality of storage areas, the program comprising code which, when executed, controls a programmable machine to:
    set an access attribute of update to either permission or refusal for a plurality of files, and when changing the access attribute from update permission to update refusal, changing a backup attribute to designate backup;
    store data records divisionally in logical files and store information of an access control of each file, including an attribute of update permission of data in the file and an attribute of update refusal;
    execute an update of data in response to a data update request from an application program when update requested data is for a file having an access attribute of update permission;
    judge the data update request as an error when the update requested data is for the file having an access attribute of update refusal;
    implement a backup operation for each respective file of the plurality of files, according to:
        make a backup of a file when it has the access attribute of update permission;
        make a backup of the file when it has the access attribute of update refusal when the backup is the first backup procedure after the access attribute of the file changes from the access attribute of update permission to the access attribute of update refusal, irrespective of whether or not a content of the file has changed since a last backup of the file; and,
        not make a backup of the file when the backup is not the first backup procedure after the access attribute changes from the access attribute of update permission to the access attribute of update refusal.

8. The storage medium according to claim 7, wherein the access attribution is changed to the attribute of update refusal by a flag which manages a transition of the attribute.

9. The storage medium according to claim 7, wherein a function is provided to randomly set the attribute of update permission and the attribute of update refusal.

10. The method according to claim 1, wherein whether the backup is the first time is determined by referring to a backup attribute of each file, and the backup attribute of the file is changed to designate no backup after the backup of the file is made.

11. The system according to claim 4, wherein whether the backup is the first time is determined by referring to a backup attribute of each file, and the backup attribute of the file is changed to designate no backup after the backup of the file is made.

12. The storage medium according to claim 7, wherein whether the backup is the first time is determined by referring to a backup attribute of each file, and the backup attribute of the file is changed to designate no backup after the backup of the file is made.

13. The method according to claim 1, wherein the backup attribute to designate backup, is indicative of the backup being the first backup procedure after the access attribute of the file changes from the access attribute of update permission to the access attribute of update refusal.

14. The system according to claim 4, wherein the backup attribute to designate backup, is indicative of the backup being the first backup procedure after the access attribute of the file changes from the access attribute of update permission to the access attribute of update refusal.

15. The storage medium according to claim 7, wherein the backup attribute to designate backup, is indicative of the backup being the first backup procedure after the access attribute of the file changes from the access attribute of update permission to the access attribute of update refusal.

* * * * *